Oct. 16, 1923.
W. BARNETT
AUTOMOBILE LOCK
Filed Jan. 3, 1920
1,470,662
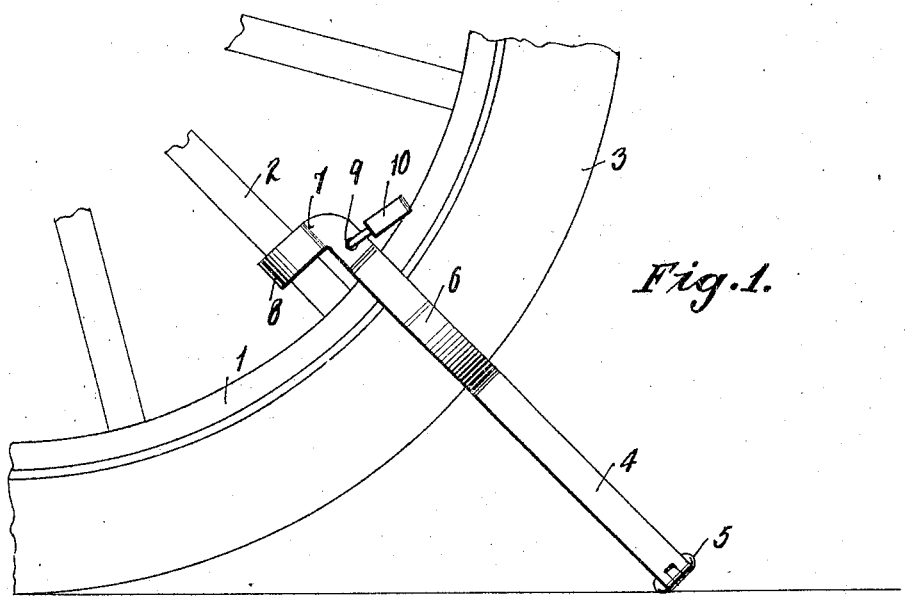
Fig.1.
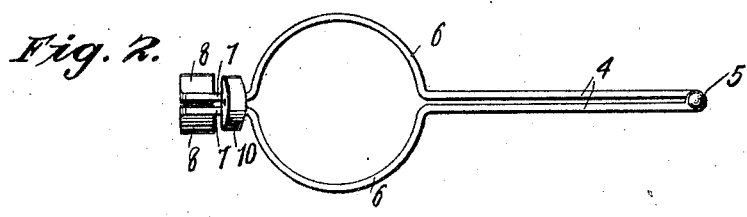
Fig.2.
Fig.3.
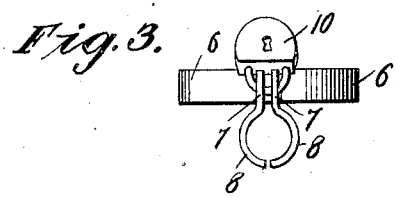
Witnesses
W. C. Fielding
J. P. Campbell
Inventor
William Barnett
By Richard Owen
Attorney Patented Oct. 16, 1923.

1,470,662

UNITED STATES PATENT OFFICE.

WILLIAM BARNETT, OF PORTLAND, OREGON.

AUTOMOBILE LOCK.

Application filed January 3, 1920. Serial No. 349,244.

*To all whom it may concern:*

Be it known that I, WILLIAM BARNETT, a citizen of the United States, residing at Portland, in the county of Multnomah and State of Oregon, have invented certain new and useful Improvements in an Automobile Lock, of which the following is a specification.

My invention relates to new and useful improvements in an automobile lock and has for its principal object the provision of a lock adapted to be connected to the wheel of an automobile to prevent an unauthorized person from driving the automobile.

Another object of the invention resides in the construction of the lock in such a manner that it may encircle the tire of the wheel and at the same time engage one of the wheel spokes to prevent the lock from being turned to either side.

A further object consists in the construction of the device in such a manner that it may be cheaply made to adapt itself to the use of all automobile drivers and at the same time may be easily applied to the wheel or removed therefrom.

With these and other objects in view my invention consists in the novel details of construction and arrangement of parts which will be more clearly understood from the following specification and drawings in which:—

Figure 1 is a side elevation showing my lock applied to an automobile wheel.

Figure 2 is a top plan, and

Figure 3 is an end view.

In the drawings the numeral 1 indicates the wheel rim, 2 the spokes, and 3 the tire.

My improved lock is formed of two strips of metal 4 which are hingedly connected at one end as indicated at 5. The strips are curved intermediate their ends to form the arcuate shaped portions 6 and as is more clearly illustrated in Figure 2 of the drawings the two arcuate shaped portions, when the strips are brought together, form a circular opening to receive the wheel rim 1 and tire 3.

Right angled extensions 7 are formed on the free ends of the strips 4 and the ends of these extensions are curved as indicated at 8 as more particularly illustrated in Figure 3 of the drawings. When the strips are brought together the curved portions 8 of the two strips will form a circular opening adapted to receive one of the spokes 2 of the wheel. An opening 9 is formed in each of the strips 4, adjacent the right angled extensions 7, and the shackle of a lock 10 is adapted to be passed through the openings 9 to lock the strips 4 together.

From the above detailed description it is thought that the construction of my lock as well as the manner of using will be clearly understood. When the automobile driver leaves his automobile my lock is adapted to be applied around the wheel as indicated more particularly in Figure 1 of the drawings. To apply, the lock 10 is removed and the strips 4 are swung upon the hinge 5. When the strips are thus open they are applied around the wheel as indicated and the opening formed by the arcuate shaped portions 6 will receive the rim 1 and tire 3. The curved extensions 8 of the right angled extensions 7 will fit around one of the spokes 2. When thus applied the shackle of the lock 10 is placed through the openings 9 and the strips will be secured together and when the wheel is turned the hinged end 5 will engage the ground as shown more particularly in Figure 1 of the drawings. It will thus be seen that it will be impossible for any unauthorized person to drive away with the car. By having the curved extensions 8 engaging around a spoke it is impossible to swing the lock transversely so that it will extend to the side of the wheel. I lay particular stress upon this feature of my lock for the reason that if I did not provide the means engaging the spokes an unauthorized person might deflate the tire and in this way turn the lock to the side. The strips 4 are made of sufficient length to engage the ground a distance in front of the wheel so that it would be impossible to drive. I also lay particular advantage in the fact that my lock is adapted for use with a padlock of ordinary construction and if an automobile driver should lose his key it will be only necessary to replace the padlock. When the authorized person desires to drive the automobile he only removes the lock 10 and swings the strips 4 on the hinge 5 and thus removes the device from the wheel.

The foregoing description and accompanying drawings have reference to what might be considered to be the approved, or preferred, form of my invention. I desire it to be understood that I may make such changes in construction, combination and arrangement of parts, materials, dimensions, et cetera, as may prove expedient and fall within the scope of the appended claim.

Having fully described my invention what I claim as new and desire to secure for Letters Patent is:—

A device of the class described including a pair of strips hingedly connected at one end, said strips being curved a distance from their hinged ends so as to form arcuate shaped portions for embracing a tire, the free ends of the strips being offset at right angles to the plane of the arcuate shaped portions and curved into arcuate shaped spoke engaging members, and said strips provided with apertures between the arcuate shaped portions for receiving a lock.

In testimony whereof I affix my signature in presence of two witnesses.

WILLIAM BARNETT.

Witnesses:
 NATHALIE FRANCIS,
 JOSEPH HARRIS.